United States Patent Office 3,528,770
Patented Sept. 15, 1970

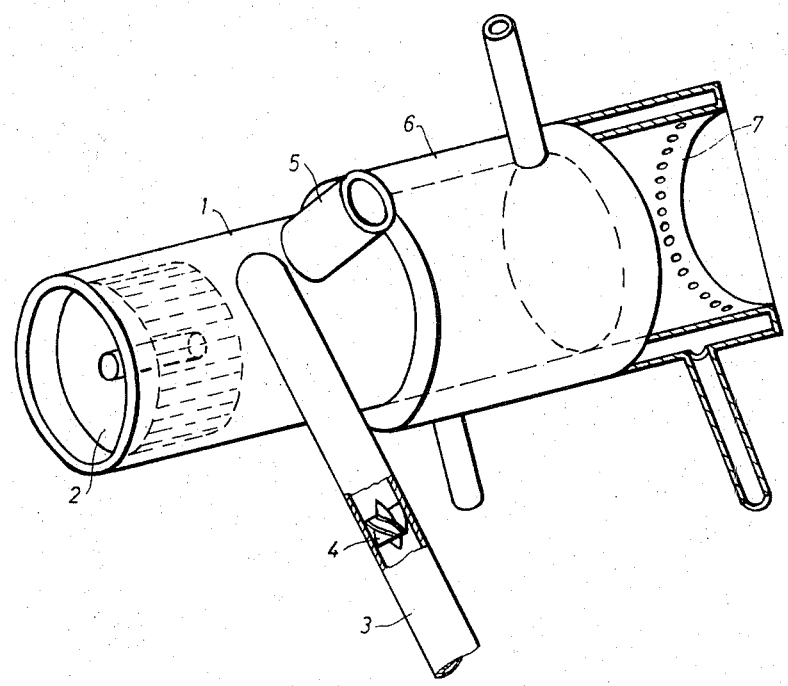

3,528,770
PREPARATION OF ZINC OXIDE OF HIGH PHOTOSENSITIVITY
Roland Weisbeck, Cologne-Poll, Germany, assignor to Agfa-Gevaert Aktiengesellschaft, Leverkusen, Germany, a corporation of Germany
Filed Apr. 21, 1967, Ser. No. 632,778
Claims priority, application Germany, Apr. 28, 1966, A 52,296
Int. Cl. C01g 9/02
U.S. Cl. 23—148                                        8 Claims

ABSTRACT OF THE DISCLOSURE

Zinc oxide of more uniformly high quality for photoconductive use is produced by burning zinc-containing vapors in an elongated axially symmetrical combustion chamber into which the vapors are introduced axially adjacent one end and oxygen-containing gas is introduced tangentially along the wall of the chamber to help keep the zinc oxide from engaging the chamber wall and in addition causing the stream of oxygen-containing gas to spin around its direction of travel as it is tangentially introduced. In place of or in addition to such spinning supplemental streams of oxygen-containing gas can be introduced radially into the chamber adjacent its discharge end and around its entire circumference, the supplemental streams totalling about 5 to 30% of the quantity introduced tangentially. More than one tangential stream of oxidizing gas can be introduced and spinning can be made adjustable. The chamber can have its length L so related to its diameter D that $L/D^2$ is between $1/10$ cm.$^{-1}$ and 1 cm.$^{-1}$, preferably between $3/10$ and $7/10$ cm.$^{-1}$.

---

The invention relates to an apparatus for the preparation of zinc oxide of high photosensitivity by the combustion of zinc vapour.

Zinc oxide can be prepared by known wet chemical or pyrogenic processes. In pyrogenic processes, a distinction is made between the so-called "American or direct process" starting from zinc ores or their roasted products, metallurgical by-products or ashes, and the so-called "French or indirect process" in which metallic zinc is vapourized and the vapour is burnt. It is known that only the zinc oxides prepared by the French process are to any extent satisfactory in their photosensitivity, e.g., their photoconductivity.

The known French processes differ from each other in the type of muffles, the construction of the furnaces, the choice of raw material, the type and form of heating and the construction of the oxidation chambers and receivers. In the chamber for the deposition of zinc oxide vapour, fractionation according to particle size and to some extent according to purity takes place such that the coarsest fraction is deposited nearest to the combustion chamber. In many cases, the finest fraction is of higher purity than the coarsest fraction.

Although the processes hitherto known by which zinc oxide is prepared by the combustion of metallic zinc yield zinc oxide of good quality for use in paints and related products, rubber products, in the manufacture of glass, enamel and ceramics and in the pharmaceutical industry, these processes are unsuitable in their present form for obtaining zinc oxide of high photosensitivity such as is required, for example, for the production of photoconductive layers for use in electrophotography.

Zinc oxide suitable for this purpose must have only a very low conductivity in the dark and must have the property of adsorbing a large quantity of oxygen on the surface of the grain. In addition, the conductivity of the zinc oxide must increase even with only weak exposure; moreover, the oxygen adsorption layer on the grain surface must be capable of rapid desorption and this desorption must take plate to a large extent even in response to only weak exposure.

From the physics of semi-conductivity is is known that zinc oxide is a reduction semiconductor and always has a more or less large deficiency of oxygen in the crystal lattice and that the speed of response of the zinc oxide to incident light depends to a large extent on the disorder of the lattice. A zinc oxide suitable for electrophotography must be as far as possible stoichiometric and pure and should at the most have a lattice which is only slightly disturbed due to intrinsic disorder of structure. The requirement of purity is not so important if the other requirements can be more completely fulfilled by slight doping at the lattice sites.

The known methods based on the French process are unable to yield a zinc oxide product, or at least are unable to do so in a reproducible manner which could even remotely fulfill the above mentioned stringent requirements which must nowadays be placed on zinc oxide for use in obtaining rapid production of high quality electrophotographic images with inexpensive sources of light of only low intensity combined with brief exposure times.

U.S. patent application Ser. No. 520,288 filed Jan. 12, 1966, now U.S. Pat. No. 3,467,497 relates to an apparatus for the production of zinc oxide of high photosensitivity by a process which comprises combustion of zinc vapour and thermal after-treatment of the zinc oxide fumes. The apparatus consists of an axially symmetrical combustion chamber provided with an axial injection aperture for the zinc vapour and at least one gas injection pipe connection which is attached tangentially and lies in a plane perpendicular to the axis, such that the said pipe connections are arranged either in one plane or staggered in relation to each other in such a manner that the zinc vapour which is carried along the axis together with reducing gases is burned by the gases (oxygen or air) injected in stoichiometric excess through the gas injection pipes, in a flame that does not touch the wall of the chamber.

One disadvantage of this apparatus is that, as the size of the combustion chamber increases, mixing of the zinc vapour with the oxidizing gas becomes incomplete, a factor which manifests itself in variations in the nature of the combustion occurring and the temperatures obtained.

The object of the present invention is to overcome the above mentioned disadvantages and to provide an apparatus in which the conditions for combustion of the zinc vapour are kept constant. By such means, it should be possible to ensure reproducibility of the zinc oxide charges and to provide a means whereby the conditions of combustion can be varied in a manner defined by external parameters. This would lead to control of the properties of the zinc flame, so that zinc oxides are obtained which can be used in the production of photoconductive layers which can be charged to high voltages without showing any dielectric breakdown regions. After charging the zinc oxide layers would undergo only a slight decay in the dark and would have high photosensitivity.

It has now been found that zinc oxides having the required properties are obtained if the zinc vapours is transported together with the reducing gases along the axis of a combustion chamber of substantially axial symmetry and if oxygen or air is injected into this chamber approximately perpendicularly to the axis and tangentially to the jacket of the combustion chamber through swirl baffles arranged in the inlet pipe immediately before the gas enters the combustion chamber and if, in addition, oxygen or air is injected in a direction radial to the axis from an annular nozzle which is preferably arranged at the outlet aperature of the combustion chamber.

The particular advantages of this apparatus lie in the fact that owing to the eddy of oxygen or air which is injected tangentially, preferably near the inlet aperture of the combustion chamber, and which moves in a helical path along the inner wall of the combustion chamber and owing to the stream of oxygen or air injected radially from an annular nozzle, preferably at the outlet aperture of the combustion chamber, the zinc flame can be concentrated to a small volume in what might be termed a gaseous bottle, which provides continuous supply of oxygen. The site of formation of the zinc oxide particles and their time of stay in the flame are thereby approximately defined. The temperature of the flame is substantially constant over the whole volume of the flame, and both the flame temperature and the time the zinc oxide particles stay in the flame can be accurately controlled by the quantity of zinc evaporating per unit time, and by the stream of reducing gas as well as by the streams of oxygen or air injected tangentially and radially. Owing to the control of the flame temperature and of the time of stay of the zinc oxide particles in the flame, the particles size of the zinc oxide particles can conveniently be varied accurately within the region of 0.1 to 1.0 micron. The swirl baffle fitted into the pipe arranged tangentially to the jacket of the combustion chamber and lying in a plane perpendicular to the axis of the combustion chamber causes the oxygen or air current to spin around its direction of propagation, whereby the gas bottle which would otherwise, i.e., without the swirl baffle, be in the form of a helix along the wall of the combustion chamber, is expanded to the axis, thereby causing still greater turbulence in the flame and more thorough mixing of the zinc vapour with oxygen and hence more uniform conditions of combustion and temperature in the zinc flame.

The more uniform mixing of the reaction components and the better constancy of the flame temperature manifest themselves in a better stoichiometric relationship in the composition of the zinc oxide, which has a natural tendency to contain a slightly less than equivalent amount of oxygen, and in a reduced intrinsic lattice disorder of the zinc oxide lattice. This process also results in improvement in the properties of the electrophotographic layers produced from the zinc oxide.

The apparatus according to the invention for the production of zinc oxide by combustion of zinc vapour will be described in more detail below.

Metallic zinc, as far as possible free from impurities, is evaporated in an atmosphere of inert gases and/or reducing gases, preferably in an atmosphere containing hydrogen, at temperatures preferably between about 900 and 1100° C. This zinc vapour and the gases present are discharged along the axis of an axially symmetrical combustion chamber which is not heated externally and, in most cases, even cooled externally with air or water. The zinc oxide fumes, and other gases or gaseous or vaporous products resulting from the combination flow out of the combustion chamber into a chamber in the immediate proximity, which chamber has a large volume compared with that of the combustion chamber. In this chamber, the zinc oxide fumes are thermally after-treated for a short time (of the order of 10 to several hundred seconds) at temperatures between about 600 and 800° C. The zinc oxide is deposited downstream of this after-treatment chamber, e.g., by electrostatic means.

The combustion chamber is preferably in the form of a cylinder or a cone of circular cross-section, and is made of quartz glass or other quartz ware, or a refractory metal or refractory alloy, or, preferably, a high grade steel, e.g. VA steel.

A nozzle with a cylindrical bore of circular cross-section is arranged as the inlet aperture for discharging the incoming vapors along the axis of the chamber, to concentrate the zinc vapour along the axis.

Oxygen or air is injected at a location downstream of the nozzle tangentially to the surface of the combustion chamber and in a plane perpendicular to its axis. Vortices are formed which move in a helical path along the inner wall of the combustion chamber. Along the first part of its path, the vortex clings to the wall of the combustion chamber, cools it and keeps it free from ZnO deposits, and constricts the flame so that the flame burns in a cylinder of oxygen and does not touch the walls of the chamber. Owing to friction, the vortex gradually moves away from the walls and leads to strong turbulence which causes thorough mixing of the zinc vapour with the oxygen.

To increase the turbulence and to improve mixing, a swirl baffle is built into the oxygen or air injection pipe, preferably just before entry into the combustion chamber, to cause the injected gas to spin around its direction of flow, so that the injected gas vortex expands to the axis of the combustion chamber. The spinning direction imparted by the swirl baffle is not important, in respect of combustion, whether it is to the left or to the right. In the simplest case, the baffle fixed into the pipe consists of an axially symmetrical body provided with grooves or blades which deflect the flow. It may also consist of a stream of baffle plates which can be adjusted from outside while apparatus is in operation to vary the magnitude of the change in direction of flow. The same effect can be achieved by means of a rotatable swirl system which may, for example, be set into rotation electrically from outside.

It may, in some cases, be advantageous, especially in the case of relatively large combustion chambers and correspondingly high rates of throughput of zinc which require correspondingly large quantities of oxygen, to inject oxygen or air at several points tangentially of the combustion chamber along planes approximately perpendicularly to the axis of the chamber, in the manner described above. The total quantity of oxygen is in this way divided between several vortices. A swirl baffle may be arranged in each inlet pipe. The baffles are in this case advantageously provided with an externally attached adjustment device so that the optimum baffle adjustments can be found empirically during operation.

By using a suitably designed combustion chamber, the zinc flame burns almost completely inside the chamber. The flame, and hence also the properties of the ZnO particles produced in this flame are in this case distinguished by a high degree of reproducibility which may partly be lost if, owing to some disturbance or other, the flame no longer burns completely inside the combustion chamber but erupts into the aftertreatment chamber. This may occur, for example, in the event of vibrations in the flame due to various causes.

The present invention provides for the flame to be firmly stabilised and securely confined to the volume of the combustion chamber by providing an annular orifice, preferably in the outlet aperture of the combustion chamber. The annular nozzle consists of a hollow ring of rectangular or circular cross section which is situated at the very end of the combustion chamber and forms a direct continuation of it. The hollow ring has the same internal diameter as the combustion chamber at its output aperture. On the inside of the hollow ring are a large number of small orifices. Oxygen or air is blown into the ring. Oxygen or air thus flows through the small orifices preferably radially towards the axis of the combustion chamber. Instead of having a large number of small orifices, the ring may alternatively be provided on its inner surface with a continuous or partly interrupted thin slit through which oxygen or air flows out, preferably in a radial direction. It has been found that this radial flow makes eruption of the zinc flame into the after-treatment chamber impossible. The quantity of oxygen or air required for this is about 5 to 30% of the quantity injected tangentially.

It is advisable, especially when using a comparatively large combustion chamber, to arrange several annular nozzles one behind the other (viewed in the axial direction) near the outlet aperture of the combustion chamber. Thus either by providing different sizes orifices or slots in the individual annular nozzles or by varying the pressure of oxygen or air on the individual orifices, it is possible to cause the zinc flame to be contricted either gradually or abruptly at the outlet of the combustion chamber.

One may according to the invention operate either with swirl baffles and no annular nozzles, or with the nozzles but without baffles, or with both.

The required volume of the combustion chamber depends on the quantity of zinc to be burnt per unit time. The maximum combustion chamber load is about 50 kg. of zinc per hour per litre of combustion chamber volume. It has been found that the particle size of the ZnO particles and may other properties of ZnO remain practically unaltered if in a cylindrical combustion chamber of circular cross-section, the dimensions are varied in such a way that $L/D^2$ (L=length of chamber, D=diameter of chamber) remains practically constant (true for 0.3 cm.$^{-1} \leq L/D^2 \leq 0.7$ cm.$^{-1}$). For the dimensions of the cylindrical combustion chamber according to the invention, 0.1 cm.$^{-1} \leq L/D^2 \leq 1$ cm.$^{-1}$ applies. The combustion chamber is arranged between the furnace in which the zinc is evaporated and the chamber in which the thermal after-treatment of the zinc oxide fume takes place. The dimensions of the after-treatment chamber are about half to one order of magnitude greater than those of the combustion chamber.

The combustion chamber according to the invention and its use for the combustion of zinc vapour to ZnO is explained in the following example.

EXAMPLE (THE FIGURE)

A cylindrical combustion chamber 1 of circular cross-section which has an overall length of 20 cm., the combustion space of which is 16 cm. long and of 5.5 cm. internal diameter, is manufactured of V2A steel and arranged horizontally. In order to concentrate the zinc vapour near the axis, a cylindrical nozzle 2 of circular cross-section and made of quartz glass, 4 cm. in length and with a coaxial bore of 6 mm. diameter is inserted into the inlet aperture of the combustion chamber in such a way that its circumference form a tight fit with the end wall of the chamber. Between this quartz nozzle and the end wall of the combustion chamber is a thin layer of refractory mortar. An oxygen injection pipe 3, which has an internal diameter of 8 mm. is disposed in a plane perpendicular to the axis of the combustion chamber and opens tangentially to the wall of the chamber at the point where the jet of zinc vapour enters the combustion chamber. A swirl baffle 4 of V2A steel milled for a left-hand spin is fixed into the pipe 3 about 3 cm. before the position where the oxygen enters the combustion chamber. On the upper side of the horizontally arranged combustion chamber near the point where the oxygen injection pipe 3 enters the chamber there is an open pipe stump 5 adjusted at a small angle to the vertical. This stump is normally closed by a ceramic stopper when the apparatus is in operation and enables the tubular sintered ZnO deposit which forms from time to time around the opening of the nozzle 2 to be removed. About two-thirds of the combustion part of the combustion chamber is supported by a water-cooled jacket 6. An annular nozzle 7 for oxygen is arranged at the outlet aperture of the combustion chamber, just beyond the water cooled jacket 6. The ring has the same internal diameter as the combustion chamber and it hollow wall is rectangular in cross-section. On its inside it has a plurality of circular orifices of 1 mm. diameter arranged on a circle. Oxygen flows through these orifices radially towards the axis.

11 kg. of zinc vapour and 1.6 Nm.$^3$H$_2$ are admitted per hour into the combustion chamber through the central nozzle 2 and burnt. 12 Nm.$^3$O$_2$ per hour are injected through the tube 3 and 2.5 Nm.$^3$O$_2$ per hour through the annular nozzle 7.

The zinc oxide produced in the combustion chamber, thermally after-treated in the after-treatment chamber and deposited electrostatically beyond the after-treatment chamber has an almost Gaussian particle size distribution. 10% by weight of all the particles are below 0.26 micron, 50% below 0.43 micron, and hence also 50% above 0.43 micron, and 10% are above 0.67 micron. The ZnO powder, after excitation with UV light shows a blue violet luminescence at room temperature. The oxygen present is about 10 p.p.m. less than equivalence. When coated electrophotographic paper is produced from this zinc oxide and compared with zinc oxide Photox 80 of New Jersey Zinc Co., USA, a commercial zinc oxide customarily used in electrophotography, the results obtained under the same conditions are as follows:

| | Height of charge, volt | Decay in the dark, percent | Time during which the charge has dropped to half under exposure to 50 lux incandescent light (colour temperature 2,100° K.), sec. |
|---|---|---|---|
| ZnO Photox 80 | 320 | 22 | 1.1 |
| ZnO of the example | 530 | 9 | 0.9 |

I claim:
1. In the process of burning a stream of vapors of metallic zinc to zinc oxide in an elongated axially symmetrical combustion chamber into which the vapors are introduced axially adjacent one end and oxygen-containing gas is introduced tangentially along the wall of the chamber to help keep the zinc oxide from engaging the chamber wall, the improvement according to which the chamber has a length of at least 16 cm. and a width such that the length divided by the square of the width is between 0.1 and 1 cm.$^{-1}$ and the stream of tangentially introduced gas is spun around its direction of travel as it is tangentially introduced, to make the combustion more reproducible.

2. In the process of burning a stream of vapors of metallic zinc to zinc oxide in an elongated axially symmetrical combustion chamber into which the vapors are introduced axially adjacent one end and oxygen-containing gas is introduced tangentially along the wall of the chamber to help keep the zinc oxide from engaging the chamber wall, the improvement according to which the chamber has a length of at least 16 cm. and a width such that the length divided by the square of the width is between 0.1 and 1 cm.$^{-1}$ and supplemental streams of oxygen-containing gas are introduced radially into the chamber adjacent its discharge end from around its entire circumference, the supplemental streams totalling about 5 to 30% of the quantity introduced tangentially, to make the combustion more reproducible.

3. In the process of burning a stream of vapors of metallic zinc to zinc oxide in an elongated axially symmetrical combustion chamber into which the vapors are introduced axially adjacent one end and oxygen-containing gas is introduced tangentially along the wall of the chamber to help keep the zinc oxide from engaging the chamber wall, the improvement according to which the chamber has a length of at least 16 cm. and a width such that the length divided by the square of the width is between 0.1 and 1 cm.$^{-1}$, the stream of tangentially introduced gas is spun around its direction of travel as it is tangentially introduced and supplemental streams of oxygen-containing gas are introduced radially into the chamber adjacent its discharge end from around its entire circumference, the supplemental streams totalling about 5 to 30% of the quantity introduced tangentially, to make the combustion more reproducible.

4. The combination of claim 3 in which the zinc burned is pure and is carried by a stream of combustible gas, the oxygen-containing gas is essentially all oxygen, and the combustion products are held for at least about 10 seconds at a temperature of from about 600 to about 800° C.

5. In an apparatus having an elongated cylindrical combustion chamber with an axially directed nozzle adjacent one end connected to a zinc vaporizer for introducing into the chamber vapors of metallic zinc to be burnt to zinc oxide and the wall of which chamber has a tangential inlet for introducing oxygen-containing gas tangentially to help keep the combusting zinc from engaging the chamber wall, the improvement according to which the chamber has a length of at least 16 cm. and a width such that the length divided by the square of the width is between 0.1 and 1 cm.$^{-1}$ and the zinc oxide is made with greater reproducibility by having in the tangential inlet a gas-spinning device that causes the stream of oxygen-containing gas to spin around its direction of travel as it enters the combustion chamber.

6. In an apparatus having an elongated cylindrical combustion chamber with an axially directed nozzle adjacent one end connected to a zinc vaporizer for introducing into the chamber vapors of metallic zinc to be burnt to zinc oxide and the wall of which chamber has a tangential inlet for introducing oxygen-containing gas tangentially to help keep the combusting zinc from engaging the chamber wall, the improvement according to which the chamber has a length of at least 16 cm. and a width such that the length divided by the square of the width is between 0.1 and 1 cm.$^{-1}$, and the zinc oxide is made with greater reproducibility by having adjacent the discharge end of the chamber an annular gas feed connected to discharge supplemental oxidizing gas radially inwardly toward the axis of the chamber from the entire circumference of the chamber.

7. In an apparatus having an elongated cylindrical combustion chamber with an axially directed nozzle adjacent one end and connected to a zinc vaporizer for introducing into the chamber vapors of metallic zinc to be burnt to zinc oxide and the wall of which chamber has a tangential inlet for introducing oxygen-containing gas tangentially to help keep the combusting zinc from engaging the chamber wall, the improvement according to which the chamber has a length of at least 16 cm. and a width such that the length divided by the square of the width is between 0.1 and 1 cm.$^{-1}$, and the zinc oxide is made with greater reproducibility by having in the tangential inlet a gas-spinning device that causes the stream of oxygen-containing gas to spin around its direction of travel as it enters the combustion chamber and also having adjacent the discharge end of the chamber an annular gas feed connected to discharge supplemental oxidizing gas radially inwardly toward the axis of the chamber from the entire circumference of the chamber.

8. The combination of claim 7 in which the combustion chamber is fitted with an external cooling jacket.

References Cited

UNITED STATES PATENTS

| | | | |
|---|---|---|---|
| 2,200,873 | 5/1940 | Cyr | 23—147 |
| 3,130,008 | 4/1964 | Stokes et al. | |
| 3,195,608 | 7/1965 | Voorheis et al. | 158—7 XR |

JAMES H. TAYMAN, Jr., Primary Examiner

U.S. Cl. X.R.

23—277, 284; 431—185